Oct. 13, 1959

E. B. ANDERSON 2,908,152

ANTI-FRICTION SLIP JOINT

Filed Dec. 12, 1958

Inventor
Edmund B. Anderson
By McCanna, Morsbach & Pillote
Atty's

2,908,152
ANTI-FRICTION SLIP JOINT

Edmund B. Anderson, Rockford, Ill., assignor of one-half to said Anderson and one-half to Walter H. Stark, Rockford, Ill.

Application December 12, 1958, Serial No. 780,120

9 Claims. (Cl. 64—23)

This invention relates to slip joints and particularly anti-friction slip joints.

As the torque transmitted through a slip joint is increased, the pressure between the relatively sliding surfaces of the drive and driven member is correspondingly increased and tends to resist relative longitudinal movement between the members of the slip joint. For this purpose it has heretofore been proposed to employ anti-friction ball elements between the contacting surfaces of the drive and driven members, to facilitate relative movement of the members under load. However, the prior slip joints have been relatively complex and expensive to manufacture, particularly when the joint must be constructed to enable relative sliding movement through a long distance.

Various important objects of this invention are to provide an anti-friction slip joint which can be easily and economically fabricated; which is adaptable for use in applications requiring long movement of the slip joint; which provides smooth operation, and which is rugged and durable in use.

A more particular object of this invention is to provide a slip joint including a shaft and a sleeve surrounding the shaft and wherein the grooves or races for the anti-friction ball elements are all formed at the interface between the shaft and the sleeve to facilitate formation of the races, and in which the balls are carried by the sleeve so that the joint can be adapted for long movement by merely increasing the length of the grooves in the shaft.

These, together with various ancillary objects and advantages of this invention will be more readily appreciated as the same becomes better understood by reference to the following detailed description when taken in connection with the accompanying drawings wherein.

Figure 1:
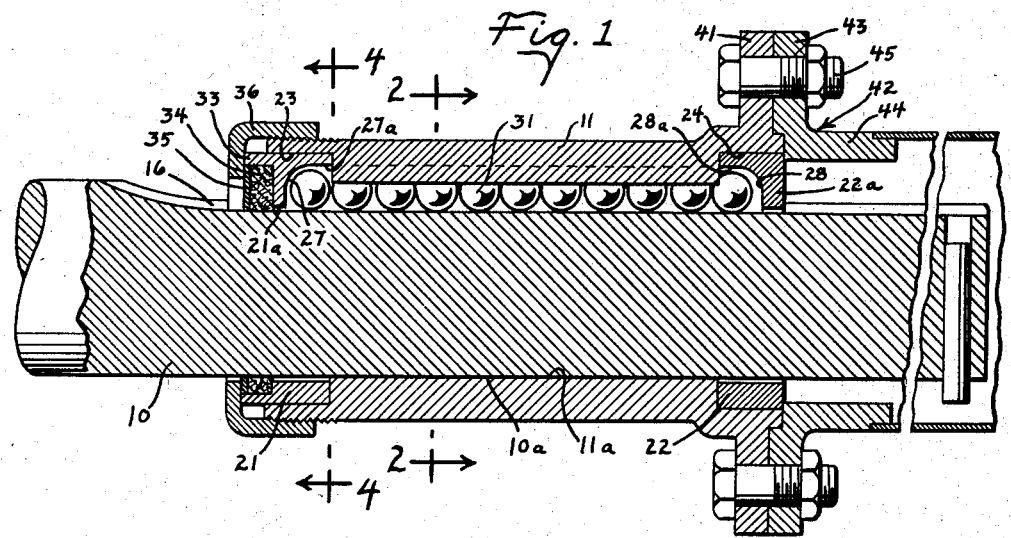
Figure 1 is a longitudinal sectional view taken through the center of the slip joint of the present invention.

The slip joint comprises a shaft member 10 and a sleeve member 11 which are slidably and non-rotatably interconnected. The shaft 10 has a smooth cylindrical outer surface and the sleeve 11 has a smooth cylindrical inner surface having a sliding fit with the outer surface of the shaft so as to guide the sleeve therealong and prevent tilting or cocking of the sleeve on the shaft, when lateral pressure is applied to the slip joint. The races or guideways for the anti-friction bearing elements are all located at the interface between the shaft and the sleeve and, in accordance with the present invention, the balls are arranged to be carried by the sleeve so as to minimize the length of the grooves or raceways which must be formed in the sleeve. More particularly, the sleeve 11 has a plurality of pairs of longitudinally extending semi-cylindrical grooves formed in the inner surface thereof. In the embodiment illustrated, three pairs of grooves are provided designated 12a and 12b, 13a and 13b and 14a and 14b, it being understood that a greater or less number of pairs of grooves may be provided if desired. The grooves of each pair are annularly spaced apart and define a guide rib therebetween respectively designated 12c, 13c and 14c.

The shaft 10 has a plurality of longitudinally extending grooves 16, 17 and 18 formed therein, each arranged to cooperate with a pair of the grooves in the sleeve to form the guideways for the anti-friction balls. As is apparent from Fig. 2, the width of the grooves 16—18 is made substantially equal to the combined width of the associated pair of grooves and the dividing rib in the sleeve, so that the side edges of the grooves 16—18, designated by the subscripts a and b, are substantially aligned with the outer edges of the complementary grooves in the sleeve. The grooves in the shaft and the associated pairs of grooves in the sleeve are angularly spaced apart so as to form a relatively wide inner and outer bearing surfaces 11a and 10a on the sleeve and shaft respectively which provide radical support between the shaft and sleeve.

Figure 3:
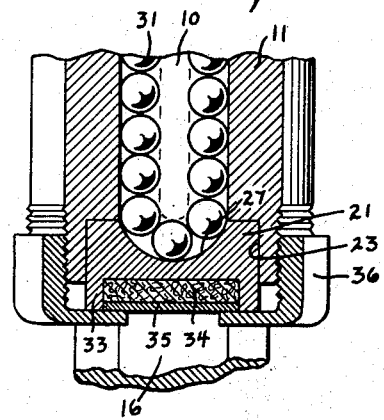
Fig. 3 is a fragmentary longitudinal sectional view taken on the plane 3—3 of Fig. 2.
Figure 2:
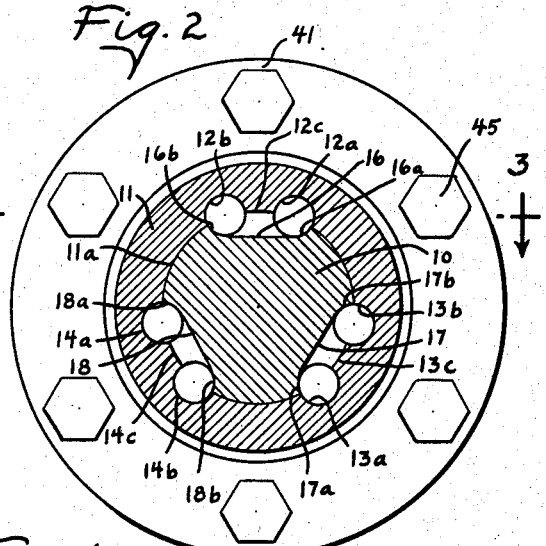
Fig. 2 is a transverse sectional view taken on the plane 2—2 of Figure 1.
Figure 4:
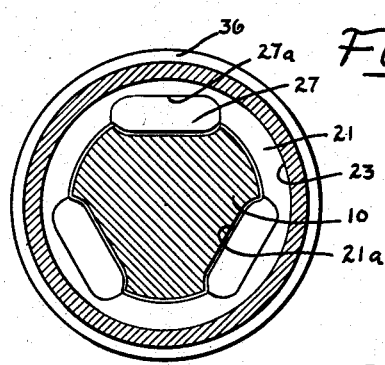
Fig. 4 is a transverse sectional view taken on the plane 4—4 of Fig. 1.

Arcuate guideways are provided at the ends of the sleeve 11 to guide the anti-friction ball elements from one groove of each pair of grooves in the sleeve crosswise of the associated groove in the shaft into the other of the grooves in the sleeve. For this purpose there have been provided ring members 21 and 22 which are formed separate from the sleeve. The ring members are disposed in counterbores 23 and 24 at the ends of the sleeve and are secured to the sleeve for movement therewith. The rings 21 and 22 each loosely surround the outer bearing surfaces 10a on the shaft 10 and have portions 21a and 22a respectively which extend into the grooves 16—18 in the shaft. A plurality of arcuate recesses 27 and 28 are formed in the inner faces of the rings 21 and 22, with each recess individual to one of the grooves of the shaft to define the aforementioned arcuate guideways at the ends of each pair of grooves in the sleeve. The arcuate recesses 27 and 28 extend crosswise of the grooves in the shaft and, as shown in Fig. 3, have a depth at the midpoint thereof slightly greater than the diameter of the antifriction ball elements so as to guide the same across the end of the guide ribs. The radially outer edges of the recesses 27 and 28 preferably extend parallel to the base of the grooves 16—18 in the shaft. Conveniently, the base of the grooves may be flat as shown in Fig. 2 so that the radially outer edges 27a and 28a of the recesses in the rings extend secantially of the rings. An arcuate fillet is preferably formed at the juncture of the base of the recesses 27 and 28 with the relatively transverse radially outer edges 27a and 28a thereof to provide a smooth guideway for the anti-friction elements. The longitudinal guideways formed by each pair of grooves in the sleeve and the cooperating groove in the shaft, and the arcuate guideways formed by the recesses in the end rings thus define an endless path and a set of anti-friction elements designated 31 are disposed in each of the endless paths to completely fill the guideways.

The rings 21 and 22 may be retained on the sleeve in any desired manner. As shown herein, the ring 21 has an axial outwardly extending rib 33 formed thereon and a resilient seal member 34 is disposed within the recess defined by the rib. A washer 35 overlies the outer face of the seal and is disposed within the ring 33, the washer and seal being contoured complementary to the shaft 10 to form a sliding seal therewith. In the embodiment illustrated, the ring 21 and seal 35 are maintained in assembled relation on the sleeve by a flanged collar 36 which is threaded on the end of the sleeve and overlies the rib 33 and washer 35, as is clearly shown in Figures 1 and 3.

The slip joint of the present invention is designed so as to be removable from the torque tube, for repair or replacement of the joint. For this purpose, a flange 41 is formed at one end of the sleeve 11 and a flanged fitting 42 having a flange portion 43 and a sleeve portion 44 is removably attached to the flange 41 as by fasteners 45. The torque tube is welded or otherwise secured to the sleeve portion and, advantageously, the flanged fitting may be arranged to overlie the outer face of the ring 28 to retain the same in assembled position on the sleeve 11.

From the foregoing it is apparent that the guideways formed by the grooves of the shaft and sleeve are all located at the interface of the shaft and sleeve so that the grooves can be formed by simple milling and broaching operations. Moreover, the sleeve is arranged to function as the carrier for the anti-friction balls so that the relative permissible movement between the shaft and sleeve is determined only by the length of the grooves 16—18 in the shaft. This permits the sleeve to be relatively short so that the grooves 12—14 therein can be easily broached or otherwise formed. The grooves 16 in the shaft must be considerably longer in order to provide the desired relative movement. However, grooves of any desired length can be formed in the shaft by a simple milling operation or the like. The rings 21 and 22 are formed separate from the sleeve to facilitate forming the same and are so arranged that the recesses therein can be easily formed in a simple milling or casting operation.

During extension and retraction of the shaft relative to the sleeve, the anti-friction ball elements in one groove of each pair of grooves in the sleeve can move or roll with the shaft, while the balls in the other groove of that pair must move in a direction opposite the direction of movement of the shaft. For example, when the shaft 10 is driven in a clockwise direction as viewed in Fig. 2, the balls in grooves in 12b, 13b and 14b will be firmly pressed by the shaft against the associated guide rib 12c, 13c and 14c on the sleeve. Consequently, when the shaft is moved in one direction relative to the sleeve, the balls in the aforementioned grooves will tend to roll in the direction of movement of the shaft. Under these conditions, the balls in the other grooves 12a, 13a and 14a must move in the direction opposite the direction of movement of the shaft. It is thus essential to proper operation of the slip joint that the balls in only one of the grooves in each pair be in driving engagement with the sleeve and shaft at any one time so that the balls in the other groove of each pair are free to move in a direction opposite the direction of movement of the shaft. Since both of the longitudinal guideways of each endless path are formed in the mating surfaces of the sleeve and shaft, the aforedescribed enlarged bearing surfaces 10a and 11a are provided on the shaft and sleeve to radially support the same and prevent binding of the balls in the guideways when lateral pressure is applied to the joint.

I claim:

1. A slip joint comprising a tubular sleeve anti-friction ball carrier having a pair of longitudinally extending annularly spaced grooves formed in the inner face thereof and defining a guide rib therebetween, a shaft extending through said sleeve and having a longitudinally extending groove formed therein cooperable with said pair of grooves in the sleeve to define a pair of longitudinally extending annularly spaced guideways separated by said guide rib on the sleeve, means on the ends of said sleeve defining arcuate guideways extending crosswise of the grooves in the shaft between the ends of the pair of longitudinally extending guideways and across the end of the guide rib to define an endless path therewith, and a plurality of anti-friction elements in said guideways and movable therein in said endless path as said sleeve and shaft move relative to each other, said groove in said shaft having a circumferential width substantially equal to the spacing between the outer edges of said pair of grooves and a length substantially greater than the length of said sleeve to permit axial movement of said sleeve intermediate the ends of said shaft.

2. A slip joint comprising a tubular sleeve anti-friction ball carrier having a plurality of pairs of longitudinally extending grooves formed in the inner surface thereof with the grooves of each pair annularly spaced apart to define a guide rib therebetween, a shaft having an outer surface slidably received on the inner surface of said sleeve and a plurality of longitudinally extending grooves formed in said outer surface each individual to a pair of the grooves in the sleeve, said groove in the shaft having a width substantially equal to the spacing between the outer edges of the associated pair of grooves in the sleeve to define a pair of longitudinally extending annularly spaced guideways therebetween separated by the guide rib on the sleeve, means on the ends of the sleeve defining arcuate guideways extending crosswise of the grooves in the shaft between the ends of each pair of longitudinally extending guideways to define an endless path therewith, a set of anti-friction elements in each of said guideways and movable therein as the sleeve and shaft are moved relative to each other, said grooves in said shaft having a length substantially greater than the length of said sleeve to permit axial movement of the sleeve intermediate the ends of the shaft.

3. A slip joint comprising a tubular sleeve anti-friction ball carrier having a plurality of pairs of longitudinally extending grooves formed in the inner surface thereof with the grooves of each pair annularly spaced apart to define a guide rib therebetween, a shaft having an outer surface slidably received on the inner surface of said sleeve and a plurality of longitudinally extending grooves formed in said outer surface each individual to a pair of the grooves in the sleeve, said groove in the shaft having a width substantially equal to the spacing between the outer edges of the associated pair of grooves in the sleeve to define a pair of longitudinally extending annularly spaced guideways therebetween separated by the guide rib on the sleeve, a pair of rings formed separate from said sleeve and secured to opposite ends thereof, said rings having arcuate recesses in the inner faces thereof, defining arcuate guideways extending crosswise of the grooves in the shaft between the ends of each pair of longitudinal guideways to define an endless path therewith, a set of anti-friction elements in each of said guideways and movable therein as the sleeve and shaft are moved relative to each other, said groove in said shaft having a length substantially greater than the length of said sleeve to permit axial movement of the sleeve intermediate the ends of the shaft.

4. The combiantion of claim 3 wherein said rings have portions extending radially inwardly into the grooves in the shaft.

5. The combination of claim 4 including means attached to the sleeve for releasably clamping said rings thereto.

6. A slip joint comprising a tubular sleeve anti-friction ball carrier having a smooth cylindrical inner surface, said sleeve having a plurality of pairs of longitudinally extending grooves formed in the inner surface with the grooves of each pair annularly spaced apart to define a guide rib therebetween and with the grooves of adjacent pairs annularly spaced apart to define an inner bearing surface therebetween, a shaft having a smooth cylindrical outer surface having a plurality of longitudinally extending grooves therein each individual to a pair of the grooves in said sleeve, said grooves in said shaft each having a circumferential width substantially equal to the spacing between the associated pair of grooves in the sleeve to define a pair of longitudinally extending guideways therebetween, said grooves in the shaft being annularly spaced apart to define an outer bearing surface therebetween having a sliding fit with said inner bearing surface on the sleeve, means on the ends of the sleeve defining arcuate guideways extending crosswise of said grooves in the shaft between the ends of each pair of longitudinal guideways to form an endless path therewith, a set of anti-friction elements in each of said guideways and movable therein as the shaft and sleeve are moved relative to each other, said grooves in said shaft having a length substantially greater than the length of said sleeve to permit axial movement of the sleeve intermediate the ends of the shaft.

7. A slip joint comprising a tubular sleeve anti-friction ball carrier having a smooth cylindrical inner surface, said sleeve having a plurality of pairs of longitudinally extending grooves formed in the inner surface with the grooves of each pair annularly spaced apart to define a guide rib therebetween and with the grooves of adjacent pairs annularly spaced apart to define an inner bearing surface therebetween, a shaft having a smooth cylindrical outer surface having a plurality of longitudinally extending grooves therein each individual to a pair of the grooves in said sleeve, said grooves in said shaft each having a circumferential width substantially equal to the spacing between the associated pair of grooves in the sleeve to define a pair of longitudinally extending guideways therebetween, said grooves in the shaft being annularly spaced apart to define an outer bearing surface therebetween having a sliding fit with said inner bearing surface on the sleeve, an annular ring at each end of the sleeve, said ring loosely surrounding said outer bearing surface on said shaft and having annularly spaced portions extending inwardly into said grooves in the shaft, said rings having arcuate recesses formed in the inner faces thereof and in said inwardly extending portions defining arcuate guideways extending crosswise of said grooves in the shaft between the ends of each pair of longitudinally extending guideways to define an endless path therewith, and a set of anti-friction elements in each of the guideways and movable therein as the sleeve and shaft are moved relative to each other, said grooves in said shaft having a length substantially greater than the length of said sleeve to permit axial movement of the sleeve intermediate the ends of the shaft.

8. A slip joint comprising a tubular sleeve anti-friction ball carrier having a pair of longitudinally extending annularly spaced grooves formed in the inner face thereof and defining a guide rib therebetween, a shaft extending through said sleeve and having a longitudinally extending groove formed therein cooperable with said pair of grooves in the sleeve to define a pair of longitudinally extending annularly spaced guideways separated by said guide rib on the sleeve, means on the ends of said sleeve defining arcuate guideways extending crosswise of the grooves in the shaft between the ends of the pair of longitudinally extending guideways and across the end of the guide rib to define an endless path therewith, and a plurality of anti-friction elements in said guideways and movable therein in said endless path as said sleeve and shaft move relative to each other, said groove in said shaft having a circumferential width substantially equal to the spacing between the outer edges of said pair of grooves and a length substantially greater than the length of said sleeve to permit axial movement of said sleeve intermediate the ends of said shaft, and means for detachably connecting said sleeve to a torque tube comprising a flange on said sleeve, and a fitting having a tubular portion adapted for connection to the torque tube and a flange portion, and fasteners extending through said flange and said flange portion for detachably connecting the same.

9. A slip joint comprising a tubular sleeve anti-friction ball carrier having a smooth cylindrical inner surface, said sleeve having a plurality of pairs of longitudinally extending grooves formed in the inner surface with the grooves of each pair annularly spaced apart to define a guide rib therebetween and with the grooves of adjacent pairs annularly spaced apart to define an inner bearing surface therebetween, a shaft having a smooth cylindrical outer surface having a plurality of longitudinally extending grooves therein each individual to a pair of the grooves in said sleeve, said grooves in said shaft each having a circumferential width substantially equal to the spacing between the associated pair of grooves in the sleeve to define a pair of longitudinally extending guideways therebetween, said grooves in the shaft being annularly spaced apart to define an outer bearing surface therebetween having a sliding fit with said inner bearing surface on the sleeve, an annular ring at each end of the sleeve, said ring loosely surrounding said outer bearing surface on said shaft and having annularly spaced portions extending inwardly into said grooves in the shaft, said rings having arcuate recesses formed in the inner faces thereof and in said inwardly extending portions defining arcuate guideways extending crosswise of said grooves in the shaft between the ends of each pair of longitudinally extending guideways to define an endless path therewith, and a set of anti-friction elements in each of the guideways and movable therein as the sleeve and shaft are moved relative to each other, said grooves in said shaft having a length substantially greater than the length of said sleeve to permit axial movement of the sleeve intermediate the ends of the shaft, and means for detachably connecting said sleeve to a torque tube comprising a flange on said sleeve, and a fitting having a tubular portion and a flange portion, said flange portion abutting against one end of said sleeve and against the ring at that end of the sleeve to retain the same in position thereon, and fasteners extending through said flange and flange portion for detachably connecting the same.

References Cited in the file of this patent
UNITED STATES PATENTS

| | | |
|---|---|---|
| 851,728 | Bayrer | Apr. 30, 1907 |
| 1,094,972 | Bocorselski | Apr. 28, 1914 |
| 1,918,108 | Jonkhoff | July 11, 1933 |
| 2,791,894 | Duckworth | May 14, 1957 |